Dec. 24, 1929.  J. W. LEARY  1,740,607

CONVEYER

Filed April 8, 1927

INVENTOR.
James W Leary
BY Sydney Prescott
ATTORNEYS.

Patented Dec. 24, 1929

1,740,607

UNITED STATES PATENT OFFICE

JAMES W. LEARY, OF BLOOMFIELD, NEW JERSEY, ASSIGNOR TO AMERICAN MACHINE & FOUNDRY COMPANY, A CORPORATION OF NEW JERSEY

CONVEYER

Application filed April 8, 1927. Serial No. 181,923.

This invention relates to an improvement in conveyers for packaging machines or other machines wherein separated masses of material are conveyed.

In conveyers using ordinary sprockets, the chain or chains must be flexible at each pin of every link, and the conveyer pockets can be secured to only one link of the chain, so that unless a chain of unusually large pitch is employed, a long conveyer pocket will have a comparatively short supporting length and will be in consequence more or less unstable. In high speed packaging machines, this is a distinct disadvantage for the reason that it often results in improper displacement of the packages which interferes with other operations performed by the machine. The main object of the present invention is the production of a conveyer which is free from the defect pointed out. To this end, sprockets are used which have non-circular pitch lines, preferably polygonal pitch lines, so that a number of link pins will remain in line while a chain turns over the sprocket, and the conveyer pockets may be secured to a plurality of the links of the chain, thereby insuring an increased stability of the pockets. Where the pitch line of the sprocket is polygonal, it is divided into relatively long and short sections, and the conveyer pockets are secured to a plurality of chain links which engage the long sections. With this and other objects not specifically mentioned in view, the invention consists in certain constructions, combinations, and parts which will be hereinafter fully described and then specifically set forth in the claims hereunto appended.

Figure 1:
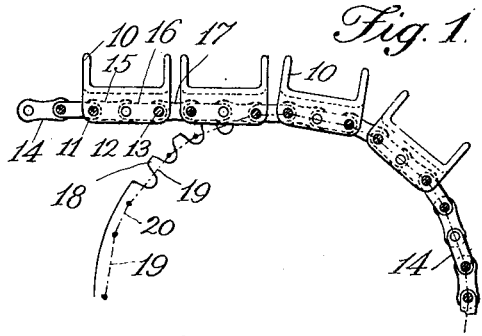
Figure 2:
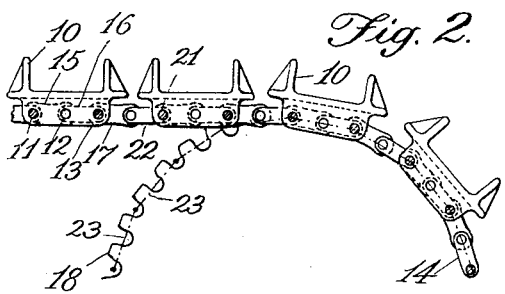
Figure 3:
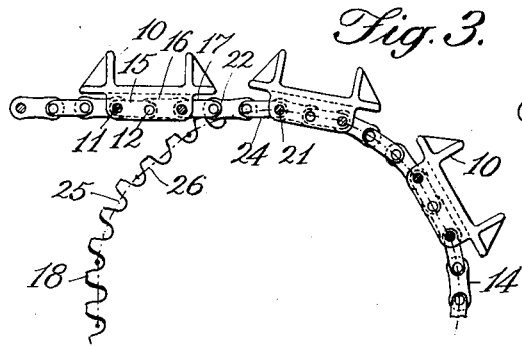
Figure 4:
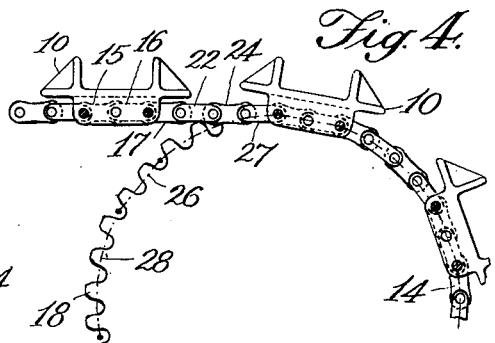
Figure 5:
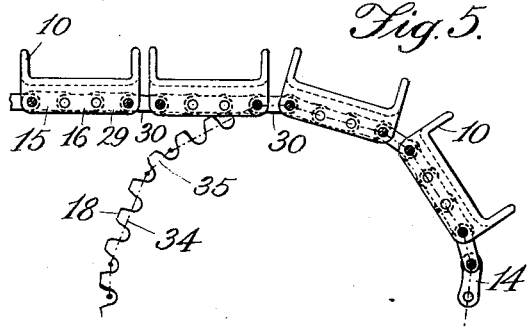
Figure 6:
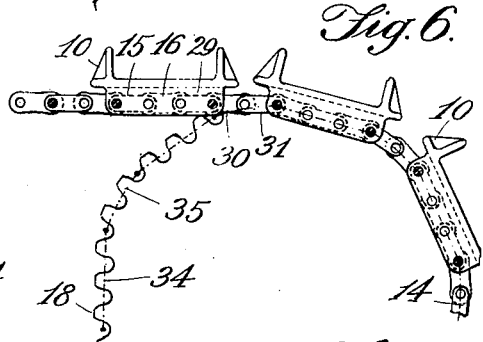
Figure 7:
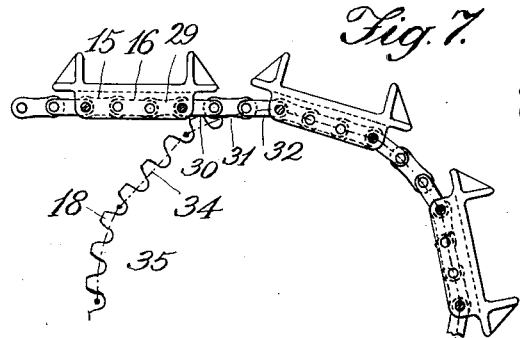
Figure 8:
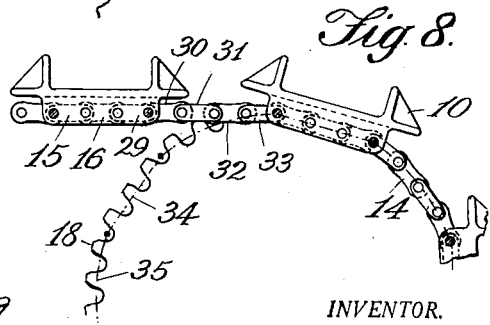

In the accompanying drawings, in which like characters of reference indicate the same or like parts, Fig. 1 is an elevation of a sprocket and conveyer chain in which the pockets span two links and are spaced one link apart; Fig. 2 shows a sprocket for a chain having pockets spanning two links and spaced two links apart; Fig. 3 shows a sprocket for a chain having pockets spanning two links and spaced three links apart; Fig. 4 shows a sprocket for a chain having pockets spanning two links and spaced four links apart; Fig. 5 shows a sprocket for a chain having pockets spanning three links and spaced one link apart; Fig. 6 shows a sprocket for a chain having pockets spanning three links and spaced two links apart; Fig. 7 shows a sprocket for a chain having pockets spanning three links and spaced three links apart; and Fig. 8 shows a sprocket for a chain having pockets spanning three links and spaced four links apart.

In carrying the invention into effect, there is provided sprockets having teeth formed on a non-circular pitch line, and a chain having pockets secured to a plurality of links of said chain, whereby the stability of said pockets is increased over the old way of mounting a pocket on a single link. In the best constructions contemplated, the pitch line of the sprockets is polygonal and is divided into relatively long and short sections, in accordance with the nature of the work to be done.

Referring to Fig. 1: The pockets 10 are attached to three pins 11, 12 and 13 of the conveyer chain, spanning two links 15 and 16, and having one link space 17 between them. In this case, the sprocket teeth 18 are cut on a polygon having alternate sides 19 of twice the length of the intermediate sides 20. The number of links included between the first pins 11 and 21 of two consecutive pockets being three, or the pocket pitch being three links, the total number of teeth on the sprocket will be a multiple of three.

In Figs. 1 to 8, the first and last pin of each pocket are indicated by shaded circles, these pins corresponding with the corners of the pitch line of the sprocket which are shown as black dots.

In Fig. 2, the pockets 10 span two links 15 and 16 as before, but have two links 17 and 22 between them. The pocket pitch in this case, from pin 11 to pin 21, is four links. Consequently, the tooth number of the sprocket is a multiple of four, and since the pocket span and pocket distance are each equal to two links, the pitch line of the sprockets may be either polygonal with equal sides 23 as shown, or it may be a circle having equally spaced flat surfaces, the lengths of the circular arcs between the flats being equal to the length of the flats, as in the case shown in Fig. 7.

In Fig. 3, showing a chain with pockets 10 spanning two links 15 and 16, spaced three links 17, 22 and 24 apart, the pitch line of the sprockets is a combination of three space circular arcs with two space straight lines 26, and the total number of teeth on the sprockets is a multiple of five.

In Fig. 4, the pockets 10 again span two links 15 and 16, and the spaces between them extend over four links 17, 22, 24 and 27. The sprocket will therefore preferably be cut on four link circular arcs 28 alternating with two links straight lines 26. However, a polygonal sprocket arranged as in Fig. 2 may be employed, provided the tooth number is a multiple of six. As in Fig. 2, the tooth number is a multiple of four, the same sprocket may be used for both chain arrangements if the tooth number is made a multiple of twelve.

In Figs. 5 to 8, sprocket arrangements for chains having pockets spanning three links 15, 16 and 29 are shown, these pockets being spaced, respectively one, two, three, and four links apart, link 30 in Fig. 5, links 30 and 31 in Fig. 6, links 30, 31 and 32 in Fig. 7, and links 30, 31, 32 and 33 in Fig. 8. The sprocket pitch lines in these cases consist of three space straight lines 34 alternating with circular arcs 35 of one, two, three and four spaces, respectively.

For any other arrangement of the pockets, if $m$ denotes the number of links spanned by the pockets, and $n$ denotes the number of links between them, the tooth number must be a multiple of $m$ plus $n$, and the pitch line is a figure consisting of $n$-unit long circular arcs alternating with $m$-unit long straight lines, or a polygon having sides of $m$-unit length alternating with sides of $n$-unit length.

What is claimed is:

1. In a conveyer for packaging machines, the combination with sprockets having teeth formed on a non-circular pitch line, of a chain having pockets secured to and holding straight a plurality of links of said chain, whereby the stability of said pockets is increased.

2. In a conveyer for packaging machines, the combination with sprockets having teeth formed on a polygonal pitch line, of a chain having pockets secured to and holding straight a plurality of links of said chain, whereby the stability of said pockets is increased.

3. In a conveyer for packaging machines, the combination with sprockets having teeth formed on a non-circular pitch line divided into relatively long and short sections, of a chain having pockets secured to and holding straight a plurality of links of said chain engaging the long sections of said sprockets, whereby the stability of said pockets is increased.

In testimony whereof, I have signed my name to this specification.

JAMES W. LEARY.